(12) United States Patent
Son et al.

(10) Patent No.: US 10,444,911 B2
(45) Date of Patent: Oct. 15, 2019

(54) FLEXIBLE TOUCH SENSING UNIT AND METHOD OF MANUFACTURING A FLEXIBLE TOUCH SENSING UNIT

(71) Applicant: Samsung Display Co., Ltd., Yongin-si (KR)

(72) Inventors: Jung-Ha Son, Seoul (KR); Jea-Neung Kim, Seoul (KR); Yong-Hwan Ryu, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 239 days.

(21) Appl. No.: 15/376,711

(22) Filed: Dec. 13, 2016

(65) Prior Publication Data

US 2017/0199597 A1    Jul. 13, 2017

(30) Foreign Application Priority Data

Jan. 8, 2016    (KR) .................. 10-2016-0002544

(51) Int. Cl.
 *G06F 3/044* (2006.01)
 *B32B 15/01* (2006.01)
 (Continued)

(52) U.S. Cl.
 CPC .............. *G06F 3/044* (2013.01); *B32B 7/05* (2019.01); *B32B 15/017* (2013.01); *B32B 15/02* (2013.01);
 (Continued)

(58) Field of Classification Search
 CPC .......... G06F 3/044; G06F 2203/04103; G06F 2203/04102; G06F 2203/04111;
 (Continued)

(56) References Cited

U.S. PATENT DOCUMENTS 5,427,841 A * 6/1995 De Leeuw ........... C08G 61/126
 428/209
6,838,384 B2 * 1/2005 Kamijima .............. B82Y 10/00
 438/702

(Continued)

OTHER PUBLICATIONS

Sara A. DiBenedetto, et al., "Molecular Self-Assembled Monolayers and Multilayers for Organic anc Unconventional Inorganic Thin-Film Transistor Applications", Advanced Materials, Apr. 14, 2009, vol. 21, pp. 1407-1433.

(Continued)

*Primary Examiner* — Grant Sitta
(74) *Attorney, Agent, or Firm* — H.C. Park & Associates, PLC

(57) ABSTRACT

A flexible touch sensing unit may include a substrate including an active touch region and an inactive region surrounding the active touch region, a plurality of first sensing electrodes disposed on the active touch region and extending along a first direction, a plurality of second sensing electrodes disposed on the active touch region and extending along a second direction, and a plurality of sensing lines disposed on the inactive region and electrically connected to the first sensing electrodes and the second sensing electrodes. Each of the sensing lines may include a first metal layer, a first conductive layer disposed on the first metal layer, and a second metal layer disposed on the first conductive layer. Each of the first sensing electrodes may include a third metal layer, and each of the second sensing electrodes may include a fourth metal layer. The first conductive layer may include a self-assembled monolayer.

19 Claims, 8 Drawing Sheets

(51) Int. Cl.
  B32B 15/02 (2006.01)
  C23F 1/14 (2006.01)
  B32B 15/04 (2006.01)
  B32B 15/08 (2006.01)
  B32B 15/082 (2006.01)
  B32B 15/09 (2006.01)
  B32B 15/20 (2006.01)
  B32B 27/06 (2006.01)
  B32B 27/28 (2006.01)
  B32B 27/30 (2006.01)
  B32B 27/36 (2006.01)
  B32B 7/05 (2019.01)

(52) U.S. Cl.
  CPC ............ *B32B 15/043* (2013.01); *B32B 15/08* (2013.01); *B32B 15/082* (2013.01); *B32B 15/09* (2013.01); *B32B 15/20* (2013.01); *B32B 27/06* (2013.01); *B32B 27/281* (2013.01); *B32B 27/285* (2013.01); *B32B 27/286* (2013.01); *B32B 27/308* (2013.01); *B32B 27/36* (2013.01); *B32B 27/365* (2013.01); *C23F 1/14* (2013.01); *B32B 2250/44* (2013.01); *B32B 2307/202* (2013.01); *B32B 2307/308* (2013.01); *B32B 2307/412* (2013.01); *B32B 2307/546* (2013.01); *B32B 2307/71* (2013.01); *B32B 2457/20* (2013.01); *B32B 2457/208* (2013.01); *G06F 2203/04102* (2013.01); *G06F 2203/04103* (2013.01); *G06F 2203/04111* (2013.01)

(58) Field of Classification Search
  CPC ....... B32B 15/20; B32B 27/36; B32B 27/308; B32B 27/286; B32B 27/285; B32B 27/281; B32B 27/365; B32B 15/09; B32B 15/082; B32B 15/08; B32B 15/043; B32B 7/045; B32B 27/06; B32B 15/02; B32B 15/017; B32B 2307/546; B32B 2307/412; B32B 2307/308; B32B 2307/202; B32B 2250/44; B32B 2457/208; B32B 2307/71; B32B 2457/20; C23F 1/14
  See application file for complete search history.

(56) References Cited

U.S. PATENT DOCUMENTS

| | | | | |
|---|---|---|---|---|
| 8,164,698 | B2* | 4/2012 | Kim | G02F 1/134363 |
| | | | | 349/122 |
| 8,486,284 | B2* | 7/2013 | Yang | G06F 3/041 |
| | | | | 178/18.01 |
| 9,024,910 | B2* | 5/2015 | Stephanou | G06F 3/0414 |
| | | | | 345/173 |
| 9,046,975 | B2* | 6/2015 | Kang | G06F 3/044 |
| 9,793,411 | B2* | 10/2017 | Li | H01L 29/786 |
| 2010/0171718 | A1* | 7/2010 | Denda | G06F 3/044 |
| | | | | 345/173 |
| 2012/0118851 | A1* | 5/2012 | Yang | G06F 3/041 |
| | | | | 216/13 |
| 2014/0028584 | A1* | 1/2014 | Park | G06F 3/041 |
| | | | | 345/173 |
| 2015/0027870 | A1* | 1/2015 | Yang | G06F 3/041 |
| | | | | 200/5 R |
| 2015/0059969 | A1* | 3/2015 | Han | G02F 1/133305 |
| | | | | 156/247 |
| 2015/0130760 | A1* | 5/2015 | Kim | G06F 3/044 |
| | | | | 345/174 |
| 2016/0254465 | A1* | 9/2016 | Lin | H01L 27/3244 |
| | | | | 257/40 |
| 2017/0147103 | A1* | 5/2017 | Han | G06F 1/1652 |
| 2017/0148982 | A1* | 5/2017 | Karpov | H01L 45/085 |
| 2018/0067366 | A1* | 3/2018 | Kimura | G02F 1/1368 |
| 2018/0321788 | A1* | 11/2018 | Kimura | G02F 1/1368 |

OTHER PUBLICATIONS

G. Kane Jennings, et al., "Effect of Chain Length on the Protection of Copper by n-Alkanethiols", American Chemical Society 1998, Sep. 25, 1996, vol. 14, pp. 6130-6139.

Toshiaki Arai, et al., "69.2: Highly Reliable Oxide-Semiconductor TFT for AM-OLED Display", ISSN 0097-966, pp. 1033-1036, May 2010.

* cited by examiner

FLEXIBLE TOUCH SENSING UNIT AND METHOD OF MANUFACTURING A FLEXIBLE TOUCH SENSING UNIT

CROSS-REFERENCE TO RELATED APPLICATION

This application claims priority from and the benefit of Korean Patent Application No. 10-2016-0002544, filed on Jan. 8, 2016, which is hereby incorporated by reference for all purposes as if fully set forth herein.

BACKGROUND

Field

Exemplary embodiments relate to touch sensing units. More particularly, exemplary embodiments relate to flexible touch sensing units and methods of manufacturing the flexible touch sensing units.

Discussion of the Background

A touch sensing unit (e.g., a touch screen panel) is an input device that allows a user's instruction to be input by selecting an instruction link displayed on the screen of a display device or the like with a user's hand or an object. The touch sensing unit may be formed on a front surface of the display device and may convert the contact location into an electrical signal. Specifically, the user's hand or the object may directly contact the touch sensing unit at the contact location. Since such a touch sensing unit may be used instead of a separate input device (such as a keyboard or mouse) connected to the display device, applications of touch sensing units have been growing.

Touch sensing units may be divided into various types, including but not limited to a resistive overlay type, a photosensitive type, and a capacitive type. Among these touch sensing units, capacitive touch sensing units may convert the contact location into an electrical signal by sensing a change in capacitance between a conductive sensing pattern and an adjacent sensing pattern or a ground electrode when the user's hand or the object comes in contact with the touch sensing unit.

Recently, a flexible display device has been developed, so the touch sensing unit attached on the flexible display device must also be flexible.

A conventional touch sensing unit may generally include sensing electrodes and sensing lines, however, a crack may occur on the sensing electrodes and/or the sensing lines when the touch sensing unit is bent or folded, thereby causing a driving malfunction in the touch sensing unit. Therefore, a flexible touch sensing unit including the sensing electrodes and the sensing lines which are flexible and durable is required.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide flexible touch sensing units including flexible conductive layers.

Exemplary embodiments also provide methods of manufacturing flexible display devices that include flexible conductive layers which may serve as an etching mask.

Additional aspects will be set forth in the detailed description which follows, and, in part, will be apparent from the disclosure, or may be learned by practice of the inventive concept.

An exemplary embodiment discloses a flexible touch sensing unit that includes a substrate including an active touch region and an inactive region surrounding the active touch region, a plurality of first sensing electrodes disposed on the active touch region and extending along a first direction, a plurality of second sensing electrodes disposed on the active touch region and extending along a second direction, and a plurality of sensing lines disposed on the inactive region and electrically connected to the first sensing electrodes and the second sensing electrodes. Each of the sensing lines may include a first metal layer, a first conductive layer disposed on the first metal layer, and a second metal layer disposed on the first conductive layer. Each of the first sensing electrodes may include a third metal layer, and each of the second sensing electrodes may include a fourth metal layer. The first conductive layer may include a self-assembled monolayer.

Another exemplary embodiment discloses a method of manufacturing a flexible touch sensing unit that includes forming a first metal layer on a substrate, and forming a conductive layer on the first metal layer by using a self-assembled monolayer. A second metal layer may be formed on the conductive layer, and the second metal layer may be patterned. The conductive layer and the first metal layer may be patterned to form first sensing electrodes, second sensing electrodes, and sensing lines.

According to exemplary embodiments, the flexible touch sensing unit may include the conductive layer including the self-assembled monolayer, thereby having flexible characteristics. Additionally, the conductive layer including the self-assembled monolayer may serve as an etching mask in the manufacturing process of the flexible touch sensing unit, so that defects of the sensing electrodes and the sensing lines may decrease.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
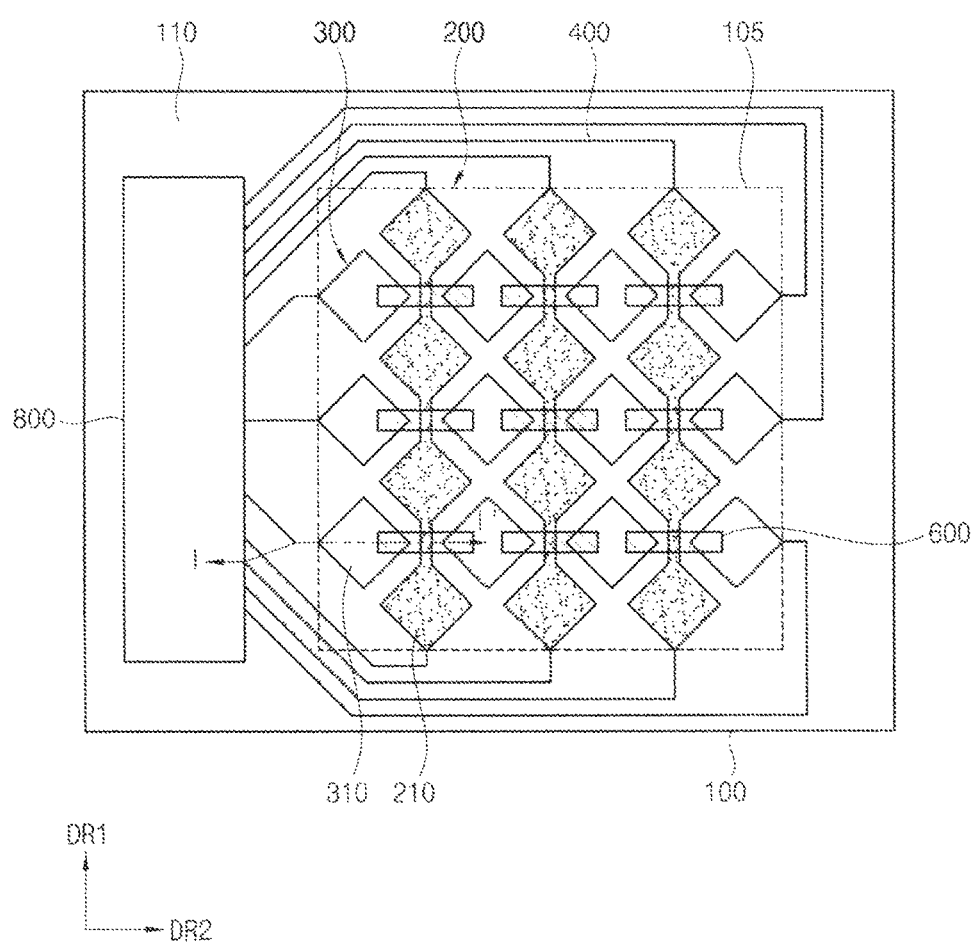
FIG. 1 is a plan view illustrating a flexible touch sensing unit in accordance with an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. As such, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, flexible touch sensing units and flexible display devices including the flexible touch sensing units in accordance with an exemplary embodiment will be explained in detail with reference to the accompanying drawings.

Figure 2:
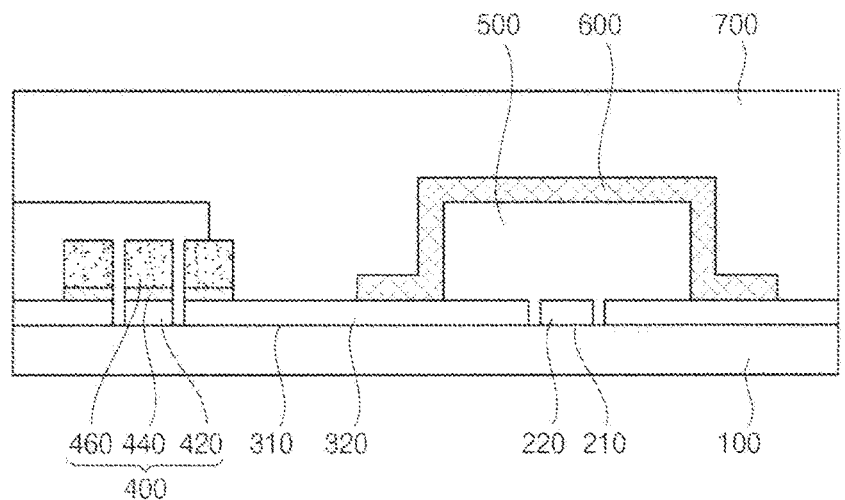
FIG. 2 is a cross-sectional view illustrating a flexible touch sensing unit in accordance with an exemplary embodiment.

FIG. 1 is a plan view illustrating a flexible touch sensing unit in accordance with an exemplary embodiment. FIG. 2 is a cross-sectional view illustrating a flexible touch sensing unit in accordance with an exemplary embodiment. For example, FIG. 2 may be a cross-sectional view cut along a line I-I' in FIG. 1.

Referring to FIG. 1, a flexible touch sensing unit may include a substrate 100, a plurality of first sensing electrodes 200, a plurality of second sensing electrodes 300, and a plurality of sensing lines 400. The substrate 100 may include an active touch region 105 and an inactive region 110. The first sensing electrodes 200 may be disposed in the active touch region 105, and may extend along a first direction DR1. The second sensing electrodes 300 may be disposed in the active touch region 105, and may extend along a second direction DR2 substantially perpendicular to the first direction DR1. The sensing lines 400 may be disposed in the inactive region 110 and may be electrically connected to the first sensing electrodes 200 and the second sensing electrodes 300.

The first and second sensing electrodes 200 and 300 for sensing touch inputs may be disposed in the active touch region 105 of the substrate 100. The sensing lines 400 may be disposed in the inactive region 110 substantially surround the active touch region 105.

The substrate 100 may include flexible, transparent, and thermostable material. For example, the substrate 100 may include polyethylene terephthalate (PET), polycarbonate (PC), acryl, polymethyl methacrylate (PMMA), cellulose triacetate (TAC), polyether sulfone (PES), and/or polyimide (PI).

The first and second sensing electrodes 200 and 300 may be located in the active touch region 105, and the flexible touch sensing unit may sense the touch inputs from a user through the first and second sensing electrodes 200 and 300. When a user's hand or an object touches the active touch region 105, capacitance between the first and second sensing electrodes 200 and 300 may be changed, and a sensing signal applied through the sensing lines 400 and a pad portion 800 may be delayed according to the change of the capacitance. The flexible touch sensing unit may sense a touch location by the user according to the delayed sensing signal.

The inactive region 110 in which the sensing lines 400 and the pad portion 800 are disposed may correspond to a dead space adjacent to the active touch region 105. The pad portion 800 may include a touch processor (not illustrated) electrically connected to the first sensing electrodes 200 and the second sensing electrodes 300, respectively, through the sensing lines 400. The touch processor may include a signal provider and a signal processor. The signal provider may sequentially provide the sensing signals to the first and second sensing electrodes 200 and 300. The signal processor may sense a delayed value of the sensing signal to sense the touch location.

In an exemplary embodiment, each of the first sensing electrodes 200 may include a plurality of first sensing cells 210. The first sensing cells 210 may be arranged along the first direction DR1, and adjacent first sensing cells 210 and may be connected to each other via a connector that has a relatively small width. Additionally, each of the second sensing electrodes 300 may include a plurality of second sensing cells 310. The second sensing cells 310 may be arranged along the second direction DR2, and adjacent second sensing cells 310 may be spaced apart from each other. Here, the adjacent second sensing cells 310 may be electrically connected to each other via a bridge 600. For example, the bridge 600 may include one of indium tin oxide (ITO) and titanium (Ti).

Referring to FIG. 2, the sensing line 400 may include a first metal layer 420, a first conductive layer 440 disposed on the first metal layer 420, and a second metal layer 460 disposed on the first conductive layer 440. Here, the first sensing cells 210 may include a third metal layer 220, and the second sensing cells 310 may include a fourth metal layer 320.

In an exemplary embodiment, each of the first metal layer 420, the third metal layer 220, and the fourth metal layer 320 may include silver (Ag) nanowire. When the first, third, and fourth metal layers 420, 220, and 320 include silver nanowire, the first, third, and fourth metal layers 420, 220, and 320 may have a relatively high flexibility and a high light transparency. Additionally, the second metal layer 460 may include aluminum (Al). When the second metal layer 460 includes aluminum, the second metal layer 460 may have a relatively high flexibility.

In an exemplary embodiment, the first conductive layer 440 may include a self-assembled monolayer (SAM). The self-assembled monolayer may be a monolayer that is formed on a surface of a base (e.g., a metal layer or a substrate) by chemical absorption or covalent binding. The self-assembled monolayer may be provided by simply contacting a self-assembled monolayer-forming material with the base. For example, the self-assembled monolayer-forming material may include alkanethiol, alkylsilane, alkyl carboxylate, etc. As described above, when the first conductive layer 440 includes the self-assembled monolayer, the first conductive layer 440 may be flexible and electrically conductive.

The flexible touch sensing unit may further include an insulation layer 500 that may partially cover the first sensing cells 210, the second sensing cells 310, and the sensing lines 400, and may insulate the first sensing cells 210, the second sensing cells 310, and the sensing lines 400 to each other.

The bridge 600 may be disposed on the first sensing cells 210 and the second sensing cells 310 to cover the insulation layer 500. The bridge 600 may electrically connect adjacent second sensing cells 310.

The flexible touch sensing unit may further include an oxidation prevention layer 700 that may cover the first sensing cells 210, the second sensing cells 310, and the sensing lines 400.

Figure 3:
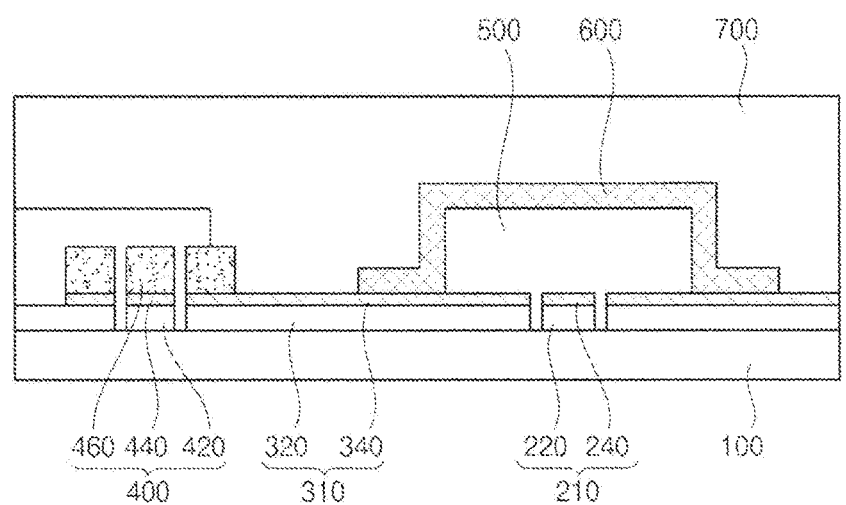
FIG. 3 is a cross-sectional view illustrating a flexible touch sensing unit in accordance with another exemplary embodiment.

FIG. 3 is a cross-sectional view illustrating a flexible touch sensing unit in accordance with some exemplary embodiments.

Detailed description on elements of the flexible touch sensing unit in FIG. 3 which are substantially the same as or similar to those explained with reference to FIGS. 1 and 2 may be not repeated.

Referring to FIG. 3, the first sensing cells 210 may include the third metal layer 220 and a second conductive layer 240, and the second sensing cells 310 may include the fourth metal layer 320 and a third conductive layer 340. Here, each of the second conductive layer 240 and the third conductive layer 340 may include the self-assembled monolayer. Since the self-assembled monolayer may be flexible and electrically conductive as described above, the flexible touch sensing unit may be flexible and may sense the touch location by the user when the first sensing cells 210 and the second sensing cells 310 include the second conductive layer 240 and the third conductive layer 340, respectively.

FIGS. 4, 5, 6, 7, 8, 9, 10, 11, and 12 are cross-sectional views illustrating a method of manufacturing a flexible touch sensing unit in accordance with an exemplary embodiment.

Figure 4:
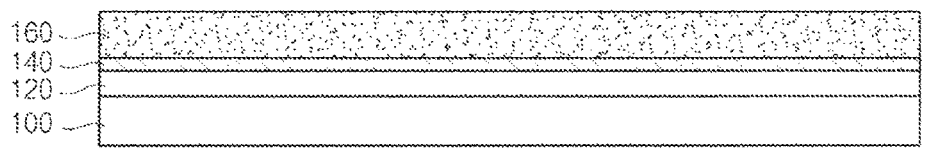
FIGS. 4, 5, 6, 7, 8, 9, 10, 11, and 12 are cross-sectional views illustrating a method of manufacturing a flexible touch sensing unit in accordance with an exemplary embodiment.

Referring to FIG. 4, the substrate 100 may be provided. The substrate 100 may include flexible, transparent, and thermostable material. For example, the substrate 100 may include polyethylene terephthalate (PET), polycarbonate (PC), acryl, polymethyl methacrylate (PMMA), cellulose triacetate (TAC), polyether sulfone (PES), and/or polyimide (PI).

A first metal layer 120 may be formed on the substrate 100. For example, the first metal layer 120 may be formed by using silver (Ag) nanowire. When the first metal layer 120 is formed of silver nanowire, the first metal layer 120 may have a relatively high flexibility and a relatively high light transparency.

A conductive layer 140 may be formed on the first metal layer 120 by using a self-assembled monolayer. The self-assembled monolayer may be a monolayer that is formed on a surface of a base (e.g., a metal layer or a substrate) by chemical absorption or covalent binding. The self-assembled monolayer may be provided by simply contacting the self-assembled monolayer-forming material with the base. For example, the self-assembled monolayer-forming material may include alkanethiol, alkylsilane, alkyl carboxylate, etc. However, the present disclosure is not limited thereto. The self-assembled monolayer-forming material may be contacted on a top surface of the first metal layer 120, so that the conductive layer 140 including the self-assembled monolayer may be formed on the first metal layer 120. When the conductive layer 140 includes the self-assembled monolayer, the conductive layer 140 may be flexible and electrically conductive.

A second metal layer 160 having flexible characteristic may be formed on the conductive layer 140. For example, the second metal layer 160 may be formed by using aluminum (Al).

Figure 5:
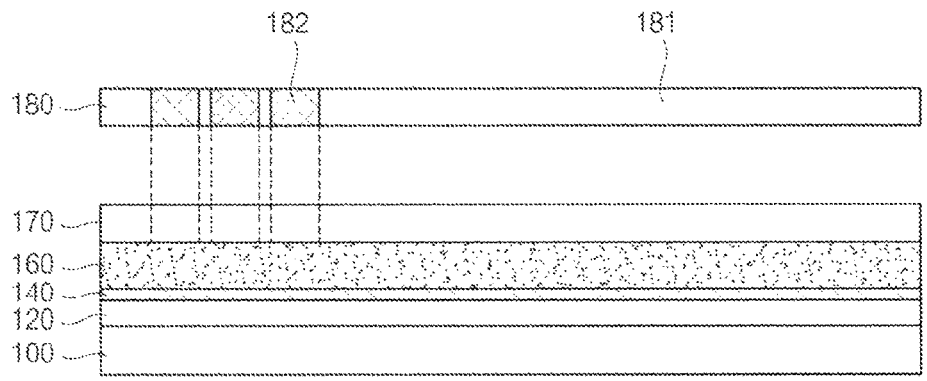

Referring to FIG. 5, after forming a first photoresist layer 170 on the second metal layer 160, a first mask 180 may be disposed over the first photoresist layer 170. For example, the first photoresist layer 170 may include a positive photoresist. The first mask 180 may include a first light-transmission portion 181 that substantially transmits light and a first light-blocking portion 182 that substantially blocks light. A portion of the first photoresist layer 170 located under the first light-transmission portion 181 of the first mask 180 may be selectively removed, and a first photoresist pattern 172 in FIG. 6 may be formed from a portion of the first photoresist layer 170 located under the first light-blocking portion 182 of the first mask 180.

Figure 6:
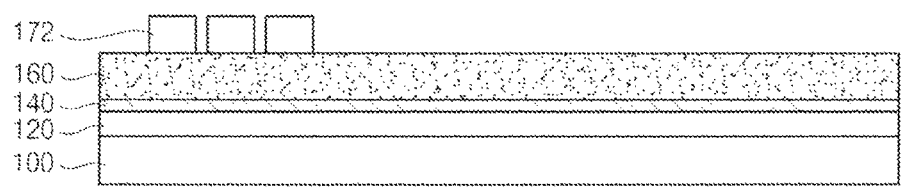

Referring to FIG. 6, the first photoresist layer 170 may be exposed and developed by using the first mask 180, so that the first photoresist pattern 172 may be formed on the second metal layer 160.

Figure 7:
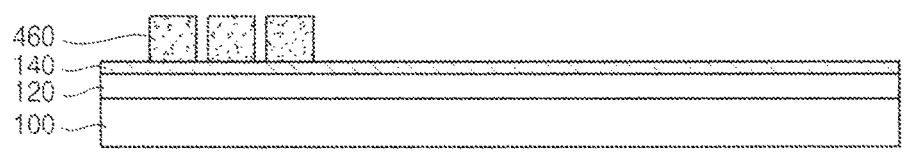

Referring to FIG. 7, the second metal layer 160 may be patterned by using the first photoresist pattern 172 as an etching mask, so that the second metal layer 460 may be formed on the conductive layer 140. For example, the second metal layer 460 may be provided by an etching process.

If the second metal layer 160 is directly disposed on the first metal layer 120 (that is, the conductive layer 140 is not formed between the first and second metal layer 120 and 160), the first metal layer 120, as well as the second metal layer 160, may be etched by an etchant. In an exemplary embodiment, the conductive layer 140 may be interposed between the first metal layer 120 and the second metal layer 160, so that the first metal layer 120 may be not etched when the second metal layer 160 is etched. In other words, the conductive layer 140 may serve as an etching mask. Therefore, defects of the flexible touch sensing unit may decrease.

Figure 8:
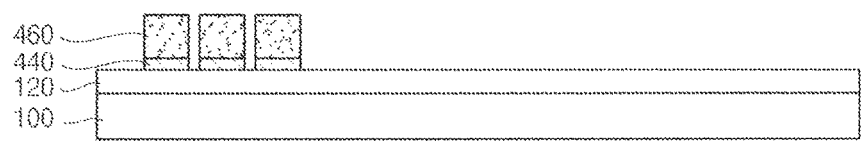

Referring to FIG. 8, the first conductive layer 440 may be formed under the second metal layer 460 by selectively removing a portion of the conductive layer 140. For example, the first conductive layer 440 may be provided by using a mild ashing process.

Figure 9:
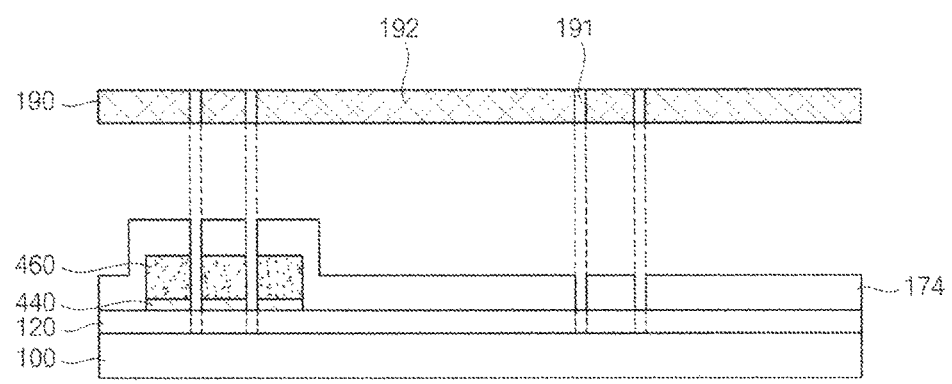

Referring to FIG. 9, after forming a second photoresist layer on the first metal layer 120, a second mask 190 may be disposed over the second photoresist layer. For example, the second photoresist layer may include a positive photoresist. The second mask 190 may include a second light-transmission portion 191 that transmits light and a second light-blocking portion 192 that substantially blocks light. A portion of the second photoresist layer located under the second light-transmission portion 191 of the second mask 190 may be selectively removed, and a second photoresist pattern 174 may be formed from a portion of the second photoresist layer located under the second light-blocking portion 192 of the second mask 190. In other words, the second photoresist layer may be exposed and developed by using the second mask 190, so that the second photoresist pattern 174 may be formed.

Figure 10:
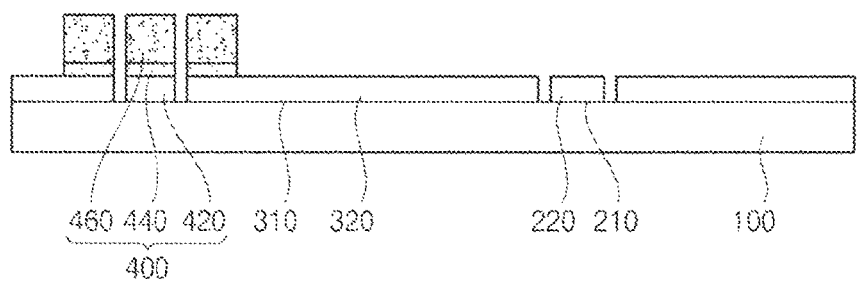

Referring to FIG. 10, the first metal layer 120 (see FIG. 9) may be selectively removed by using the second photoresist pattern 174 as an etching mask, so that the first metal layer 420, the third metal layer 220, and the fourth metal layer 320 may be formed. For example, the first metal layer 120 may be selectively removed by a wet etching process. Accordingly, the first sensing cells 210 including the third metal layer 220, the second sensing cells 310 including the fourth metal layer 320, and the sensing lines 400 including the first metal layer 420, the first conductive layer 440, and the second metal layer 460 may be formed on the substrate 100. In an exemplary embodiment, as illustrated in FIG. 1, the first sensing cells 210 may be arranged along the first direction DR1, and the second sensing cells 310 may be arranged along the second direction DR2.

Figure 11:
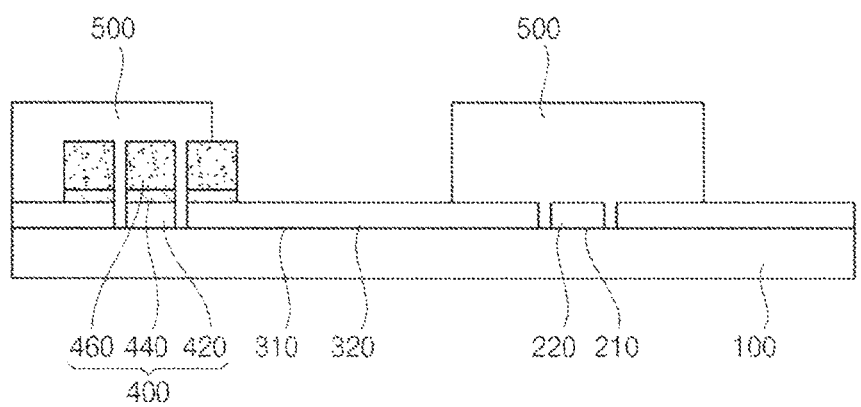

Referring to FIG. 11, the insulation layer 500 may be formed to cover the first sensing cells 210, the second sensing cells 310, and the sensing lines 400. The first sensing cells 210, the second sensing cells 310, and the sensing lines 400 may be electrically separated to each other by the formation of the insulation layer 500.

Figure 12:
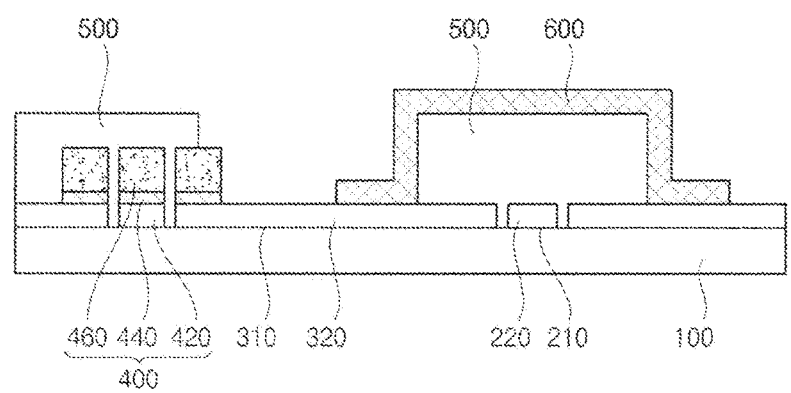

Referring to FIG. 12, the bridge 600 connecting adjacent second sensing cells 310 may be formed on the insulation layer 500. The adjacent second sensing cells 310 spaced apart from each other may be electrically connected by the bridge 600. For example, the bridge 600 may be formed by using indium tin oxide (ITO) and/or titanium (Ti). The oxidation prevention layer covering the insulation layer 500 and the bridge 600 may be formed on the substrate 100.

Figure 13:
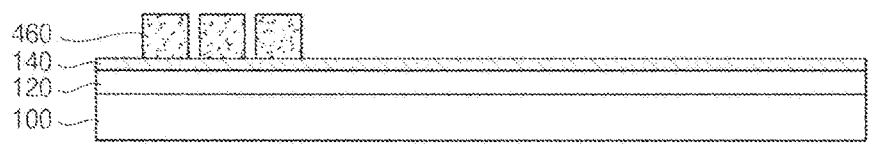
FIGS. 13, 14, and 15 are cross-sectional views illustrating a method of manufacturing a flexible touch sensing unit in accordance with another exemplary embodiment.
Figure 14:
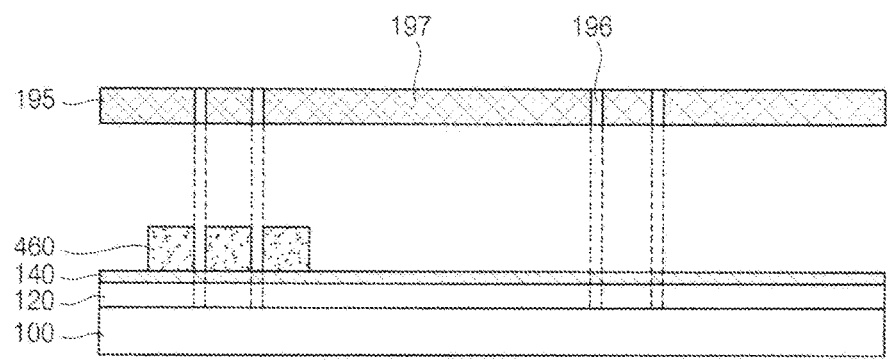
Figure 15:
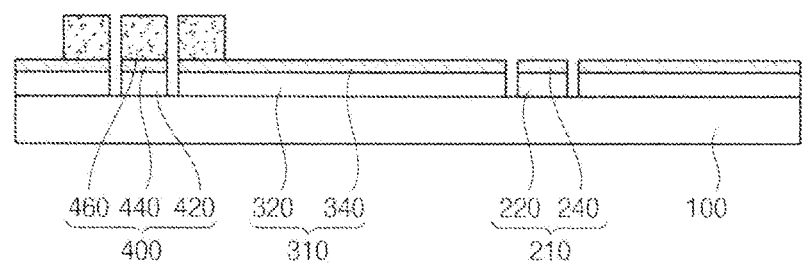

FIGS. 13, 14, and 15 are cross-sectional views illustrating a method of manufacturing a flexible touch sensing unit in accordance with an exemplary embodiment.

Detailed description on elements of the method of manufacturing the flexible touch sensing unit in FIGS. 13 to 15 which are substantially the same as or similar to those explained with reference to FIGS. 4 to 12 may be not repeated.

Referring to FIG. 13, the first metal layer 120, the conductive layer 140, and the second metal layer 460 may be formed on the substrate 100 through the processes substantially the same as or similar to those explained with reference to FIGS. 4 to 7.

Referring to FIG. 14, a third mask 195 may be disposed over the conductive layer 140. For example, the conductive layer 140 may include a positive photoresist. The third mask 195 may include a third light-transmission portion 196 that substantially transmits light and a third light-blocking portion 197 that substantially blocks light. A portion of the conductive layer 140 and a portion of the first metal layer 120 which are located under the third light-transmission portion 196 of the third mask 195 may be selectively etched, and a portion of the conductive layer 140 and a portion of the first metal layer 120 which are located under the third light-blocking portion 197 of the third mask 195 may be not etched.

Referring to FIG. 15, the conductive layer 140 may be exposed and developed by using the third mask 195 (see FIG. 14), so that the first conductive layer 440, the second conductive layer 240, and the third conductive layer 340 may be formed. Additionally, the first metal layer 120 may be selectively removed by using the first conductive layer 440, the second conductive layer 240, and the third conductive layer 340 as an etching mask, so that the first metal layer 420, the third metal layer 220, and the fourth metal layer 320 may be formed. Accordingly, the first sensing cells 210 including the third metal layer 220 and the second conductive layer 240, the second sensing cells 310 including the fourth metal layer 320 and the third conductive layer 340, and the sensing lines 400 including the first metal layer 420, the first conductive layer 440, and the second metal layer 460 may be formed. In an exemplary embodiment, as illustrated in FIG. 1, the first sensing cells 210 may be arranged along the first direction DR1, and the second sensing cells 310 may be arranged along the second direction DR2.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

The flexible touch sensing units according to an exemplary embodiment may be applied to various electronic devices. For example, the flexible touch sensing units may be applied to computers, notebooks, mobile phones, smart phones, smart pads, personal media players (PMP), personal digital assistance (PDA), MP3 players, digital cameras, and video camcorders, etc.

What is claimed is:

1. A flexible touch sensing unit, comprising:
   a substrate comprising an active touch region and an inactive region surrounding the active touch region;
   a plurality of first sensing electrodes disposed on the active touch region and extending along a first direction, at least some of the plurality of first sensing electrodes including at least two layers having conductive material;
   a plurality of second sensing electrodes disposed on the active touch region and extending along a second direction, at least some of the plurality of second sensing electrodes including at least two layers having conductive material; and
   a plurality of sensing lines disposed on the inactive region and electrically connected to the first sensing electrodes and the second sensing electrodes, at least some of the plurality of sensing lines including at least three layers having conductive material,
   the sensing lines each comprising
       a first metal layer,
       a first conductive layer comprising a self-assembled monolayer disposed on the first metal layer, and
       a second metal layer disposed on the first conductive layer, wherein
       each of the first sensing electrodes comprises a third metal layer and a second conductive layer comprising the self-assembled monolayer disposed on the third metal layer, and
       each of the second sensing electrodes comprises a fourth metal layer and a third conductive layer comprising the self-assembled monolayer disposed on the fourth metal layer.

2. The flexible touch sensing unit of claim 1, wherein each of the first metal layer, the third metal layer, and the fourth metal layer comprises silver nanowire.

3. The flexible touch sensing unit of claim 1, wherein the second metal layer comprises aluminum (Al).

4. The flexible touch sensing unit of claim 1, wherein the self-assembled monolayer comprises at least one of alkanethiol, alkylsilane, and alkyl carboxylate.

5. The flexible touch sensing unit of claim 1, wherein the self-assembled monolayer comprises at least one of alkanethiol, alkylsilane, and alkyl carboxylate.

6. The flexible touch sensing unit of claim 1, further comprising an oxidation prevention layer covering the first sensing electrodes, the second sensing electrodes, and the sensing lines.

7. The flexible touch sensing unit of claim 1, wherein each of the first sensing electrodes comprises a plurality of first sensing cells arranged along the first direction, and each of the second sensing electrodes comprise a plurality of second sensing cells arranged along the second direction.

8. The flexible touch sensing unit of claim 7, further comprising a bridge connecting adjacent second sensing cells.

9. The flexible touch sensing unit of claim 8, wherein the bridge comprises at least one of indium tin oxide (ITO) and titanium (Ti).

10. A method of manufacturing a flexible touch sensing unit, comprising:
    forming a first metal layer on a substrate;
    forming a conductive layer on the first metal layer by using a self-assembled monolayer;
    forming a second metal layer on the conductive layer;
    patterning the second metal layer; and
    patterning the conductive layer and the first metal layer to form first sensing electrodes including at least two layers having conductive material, second sensing electrodes including at least two layers having conductive material, and sensing lines including at least three layers having conductive material, with the sensing lines comprising the first metal layer, the self-assembled monolayer being disposed on the first metal layer and the second metal layer, the first sensing electrodes comprising a third metal layer and the self-assembled monolayer disposed on the third metal layer, and the second sensing electrodes comprising a fourth metal layer and the self-assembled monolayer disposed on the fourth metal layer.

11. The method of claim 10, wherein the first metal layer is formed by using silver nanowire.

12. The method of claim 10, wherein the second metal layer is formed by using aluminum (Al).

13. The method of claim 10, wherein the self-assembled monolayer is formed by using at least one of alkanethiol, alkylsilane, and alkyl carboxylate.

14. The method of claim 10, wherein the patterning the second metal layer comprises:
    forming a photoresist layer on the second metal layer;
    forming a photoresist pattern on the second metal layer by using a first mask; and
    selectively removing the second metal layer by using the photoresist pattern as an etching mask.

15. The method of claim 14, wherein the patterning of the conductive layer and the first metal layer comprises:
    selectively removing a portion of the conductive layer which is exposed by the
    selectively removed second metal layer; and
    selectively removing the first metal layer by using a second mask.

16. The method of claim 14, wherein patterning the conductive layer and the first metal layer comprises selectively removing the conductive layer and the first metal layer by using a third mask.

17. The method of claim 10, wherein each of the first sensing electrodes comprises a plurality of first sensing cells arranged along a first direction, and each of the second sensing electrodes comprises a plurality of second sensing cells arranged along a second direction crossing the first direction.

18. The method of claim 17, further comprising forming an insulation layer covering the first sensing cells, the second sensing cells, and the sensing lines.

19. The flexible touch sensing unit of claim 1, wherein the first conductive layer is configured to serve as an etching mask to prevent etching of the first metal layer.

* * * * *